June 21, 1932.  G. L. McCAIN ET AL  1,864,252
CLUTCH DISK
Filed Feb. 1, 1930
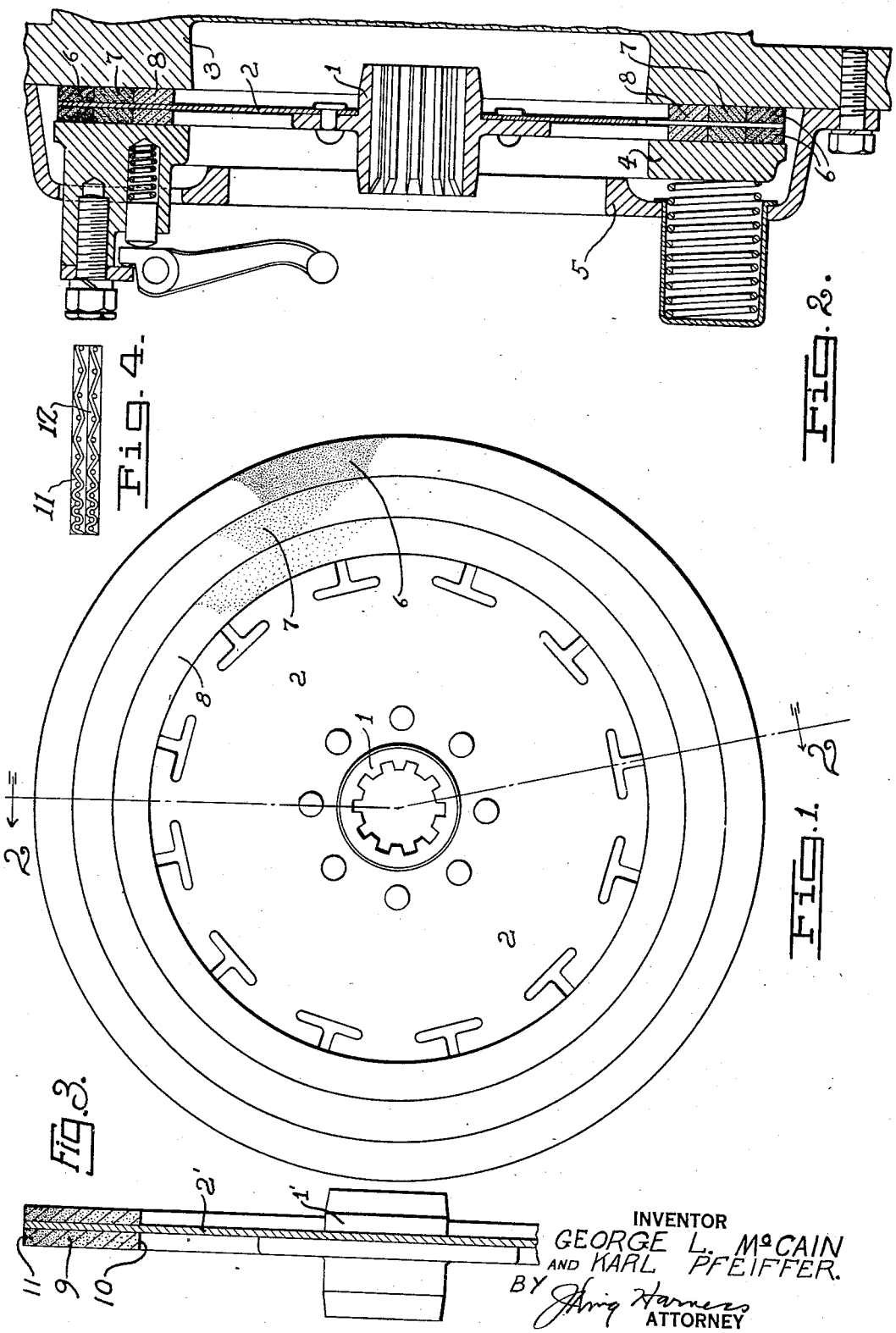
INVENTOR
GEORGE L. McCAIN
AND KARL PFEIFFER.
BY
ATTORNEY Patented June 21, 1932

1,864,252

UNITED STATES PATENT OFFICE

GEORGE L. McCAIN, OF DETROIT, AND KARL PFEIFFER, OF HIGHLAND PARK, MICHIGAN, ASSIGNORS TO CHRYSLER CORPORATION, OF DETROIT, MICHIGAN, A CORPORATION OF DELAWARE

CLUTCH DISK

Application filed February 1, 1930. Serial No. 425,308.

This invention relates to improvements in the frictional members of a clutch, particularly of the type used in motor vehicles.

Heretofore, in clutches of this kind, disks having uniform frictional side surfaces at their inner and outer diameters have chattered excessively in operation and have failed untimely. These disadvantages are attributed to the differences in driving effects at the various diameters of the disks caused by the respective distances of the parts of the frictional areas from the centers of the disks and the differences in area of the parts of the frictional surfaces at the inner and outer parts of the disks.

The main objects of this invention are to balance the driving effects between the inner and outer diameters of clutch disks so as to have all portions of the frictional surfaces transmit substantially the same driving effect regardless of their location on the disks; to provide disks in a clutch of this kind which will transmit substantially equal driving effects at its inner, intermediate and outer diameters when all parts of the disks are subjected to the same normal pressure; to provide frictional surfaces on disks of this kind which have a higher coefficient of friction at the inner diameter of the disks than at the outer peripheries thereof; and to provide frictional surfaces on clutch disks having coefficients of friction which decrease gradually from the inner to the outer diameters of the disks so as to maintain the products of the coefficients of friction, circumference and normal pressure at the various diameters substantially equal.

An illustrative embodiment of this invention is shown in the accompanying drawing, in which:

Fig. 1 is a plan view of a clutch member showing a clutch disk embodying our invention.

Fig. 2 is a section taken on line 2—2 of Fig. 1.

Fig. 3 is a fragmentary section showing another form of our invention.

Fig. 4 is a fragmentary section showing a further development of the invention.

In the form shown in Figs. 1 and 2, the clutch member comprises a hub 1 on which a disk 2 is rigidly mounted. The disk 2 is interposed between a driving member 3 and a clamping member 4 and is enclosed within a clutch housing 5.

Mounted on respectively opposite sides of the disk 2 are concentric rings 6, 7 and 8 respectively, of clutch lining, such as fabric, asbestos or metal compositions. The inner disk 8 has a coefficient of friction which is higher than the coefficient of friction of the intermediate disk 7 and the outer disk 6, and the coefficient of friction of the disk 7 exceeds that of the disk 6. Variation in the frictional characteristics in the rings may be produced in any suitable manner, such as, proper treatments of the surfaces of the rings, or the rings may comprise various kinds of materials each having the desired frictional characteristics. The widths of the rings are preferably predetermined so as to produce the same driving effect at all portions of the area of the frictional surface of the disk when the entire frictional surface is forced against the driving member 3 with a substantially uniform normal pressure.

By providing friction rings having the proper coefficients of friction it is possible to obtain a clutch structure in which the product of the circumference and coefficient of friction at all diameters and the pressure is substantially equal.

In the form shown in Fig. 3, the disk 2' is provided on its respectively opposite sides with a ring of frictional lining material 9 having a coefficient of friction which varies gradually from a maximum at the inner periphery 10 to a minimum at the outer periphery 11. The variation of the frictional characteristics may be produced in any suitable manner, as for example, by varying the weave 11, as illustrated in Fig. 4 when a fabric lining 12 is employed.

Although but several specific embodiments of this invention have herein been shown and described, it will be understood that various changes including the size, shape and arrangement of parts, may be made without departing from the spirit of our invention and it is not our intention to limit its scope other than by the terms of the appended claims.

We claim:

1. A clutch disk having a frictional driving surface, the coefficient of friction of said surface being greater at the inner part of said disk than at the outer portion thereof.

2. A clutch member comprising a disk, and lining on said disk, the coefficient of friction of said lining being greater at the inner portion of said disk than at the outer portion thereof.

3. A clutch member comprising a disk, and lining on said disk, having a maximum coefficient of friction at the inner parts of said disk and a minimum coefficient of friction at the outer parts of said disk, the intermediate part of said lining having a coefficient of friction which decreases from said maximum to said minimum coefficients.

4. In a clutch member a plurality of units of frictional lining material on one side of said member each having a working surface of a different coefficient of friction arranged substantially in a common plane, said units being arranged to produce substantially equal driving effects at all portions of said member when the normal pressure thereon is substantially uniform at all portions.

5. In a clutch, a driving member, a driven member comprising a clutch disk, and a plurality of concentric rings of clutch lining on said disk each having a different coefficient of friction.

6. In a clutch, a driving member, a driven member comprising a clutch disk, and a plurality of concentric rings of clutch lining on said disk each having a different coefficient of friction, the ring having the highest coefficient being innermost and the other rings being arranged in the order of their coefficients.

7. A clutch lining member including a ring having a frictional driving surface, the coefficient of friction of selected portions of said surface being greater than the coefficient of friction of the remaining portions thereof.

8. A clutch lining member including a ring having a frictional driving surface of circular shape, the areas of said surface at diversed radial distances from the center of said member having different coefficients of friction.

9. A clutch member comprising a disk, and concentric rings of clutch lining on said disk each comprising material of different compositions and each having a different coefficient of friction.

10. A clutch member including a support, and a ring-shaped lining member comprising an integral structure including a frictional driving surface having a greater coefficient of friction at its inner periphery than at its outer periphery.

GEORGE L. McCAIN.
KARL PFEIFFER.